United States Patent
Sumiya

(10) Patent No.: US 6,781,106 B2
(45) Date of Patent: Aug. 24, 2004

(54) SOLAR SENSOR FOR PROVIDING CONSTANT TOTAL SENSOR OUTPUT

(75) Inventor: Kazuyoshi Sumiya, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/964,408

(22) Filed: Sep. 28, 2001

(65) Prior Publication Data

US 2002/0047085 A1 Apr. 25, 2002

(30) Foreign Application Priority Data

Oct. 24, 2000 (JP) ........................................ 2000-324388

(51) Int. Cl.⁷ .............................................. G01C 21/02
(52) U.S. Cl. ............................... 250/203.4; 250/206.1; 250/216; 356/139.01
(58) Field of Search ....................... 126/573; 250/203.4, 250/203.3, 208.1, 206, 206.1, 206.2, 216; 356/141.5, 139.01, 139.02; 165/203, 42; 236/91 C

(56) References Cited

U.S. PATENT DOCUMENTS

| | | | | |
|---|---|---|---|---|
| 4,332,239 A | * | 6/1982 | Hotine | ........................ 126/576 |
| 4,362,931 A | * | 12/1982 | Maruko et al. | ............. 126/573 |
| 4,367,403 A | * | 1/1983 | Miller | ......................... 126/573 |
| 5,022,725 A | | 6/1991 | Matsunami et al. | ......... 359/726 |
| 5,072,105 A | * | 12/1991 | Osawa | ......................... 165/42 |
| 5,483,060 A | * | 1/1996 | Sugiura et al. | ........... 250/203.4 |
| 5,957,375 A | * | 9/1999 | West | .......................... 126/578 |

FOREIGN PATENT DOCUMENTS

JP          A-9-311070          12/1997

* cited by examiner

Primary Examiner—Thanh X. Luu
Assistant Examiner—Stephen Yam
(74) Attorney, Agent, or Firm—Posz & Bethards, PLC

(57) ABSTRACT

A solar sensor comprises a housing, a pair of optical devices, an optical lens and a lens member. The optical devices are disposed in the right side and the left side on the top side of the housing, respectively, of the axis parallel to the direction of travel of a vehicle. The optical lens is disposed above the optical devices and guides incident light toward the optical devices. The lens member comprising solid projections is disposed between the optical devices and the optical lens. The top surface of the lens member is coated with a screen film except the areas under the projections. The lens member makes total quantity of solar irradiation to the optical devices constant in collaboration with the optical lens.

16 Claims, 9 Drawing Sheets

LIGHT FROM FRONT SIDE

LIGHT FROM RIGHT SIDE

SOLAR SENSOR FOR PROVIDING CONSTANT TOTAL SENSOR OUTPUT

CROSS REFERENCE TO RELATED APPLICATION

This application is based on and incorporates herein by reference Japanese Patent Application No. 2000-324388 filed on Oct. 24, 2000.

BACKGROUND OF THE INVENTION

The present invention relates to a solar sensor.

A solar sensor has become an essential component in a zone-air-conditioning system that enables independent temperature control for each of passengers in the driver's seat and in the passenger's seat in a vehicle.

A solar sensor shown in FIG. 12 is proposed. The proposed sensor has a screen wall 102 between optical devices 100 and 101 to provide an output difference between optical devices 100 and 101 by means of attenuating or screening incident light irradiating to the far side optical device 101. Thereby, it is possible to detect solar azimuth angle.

Quantity of solar irradiation to a vehicle is constant irrespective of solar azimuth angle so that total output of optical devices 100 and 101 needs to be constant for controlling the zone-air-conditioning system. However, the total output is determined by total quantity of solar irradiation to optical devices 3 and 4 so that the total output is reduced when incident light is attenuated or screened by the screen wall 102.

This inconstancy in the total output in the proposed solar sensor becomes remarkable especially at low solar elevation angle. As shown in FIGS. 13a, 13b and 13c, the total output at 15° of solar elevation angle varies significantly in accordance with solar azimuth angle while the total outputs at 75° and 45° of solar elevation angles do not vary significantly. For example, the total outputs at +90° and −90° of solar azimuth angles decrease by ca. 50% in comparison with the total output at 0° of solar azimuth angle.

SUMMARY OF THE INVENTION

It is an object of this invention to provide a solar sensor that provides constant total output of optical devices in detecting quantity of solar irradiation irrespective of solar azimuth angle.

According to the present invention, a solar sensor includes an optical lens disposed above optical devices and a lens member disposed between the optical devices and the optical lens. The optical lens functions as a divergent lens and incident light spreading out from a concave formed on the optical lens irradiates a pair of projections formed on the lens member. The clearance between the concave and the projections in the direction of travel of a vehicle is larger than the clearance between the concave and the projections in the horizontally vertical direction to the direction of travel of a vehicle. Therefore, quantities of light irradiating to the projections are equally reduced by the optical lens in the case that incident light enters from the front side. However, in the case that incident light enters from the right or left side, the near side projection receives an unreduced quantity of light while the far side projection receives less light than in the case that the incident light enters from the front side. This is due to light divergence at the optical lens and interference of the near side projection with the light incident on the far side projection. As a result, a total quantity of light irradiating to the projections is the same in both cases. Thus, the total output of the left and right optical devices in a detection of quantity of solar irradiation becomes constant irrespective of solar azimuth angle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to an embodiment and various modifications of the embodiment.

(Embodiment)

Figure 1:
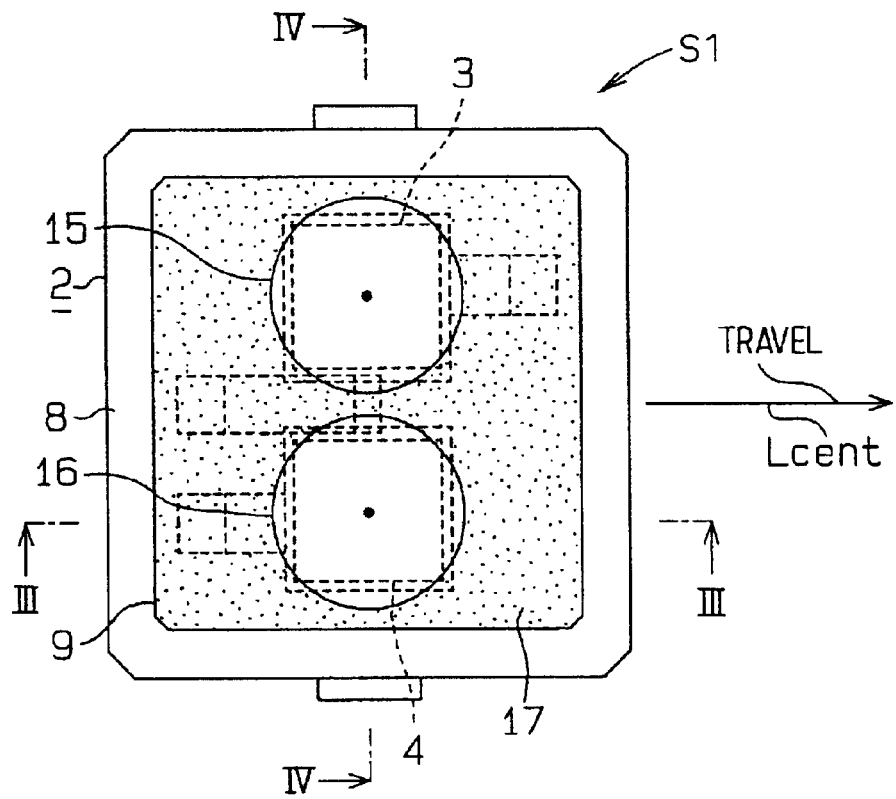
FIG. 1 is a plan view of a solar sensor according to an embodiment of the present invention.
Figure 2:
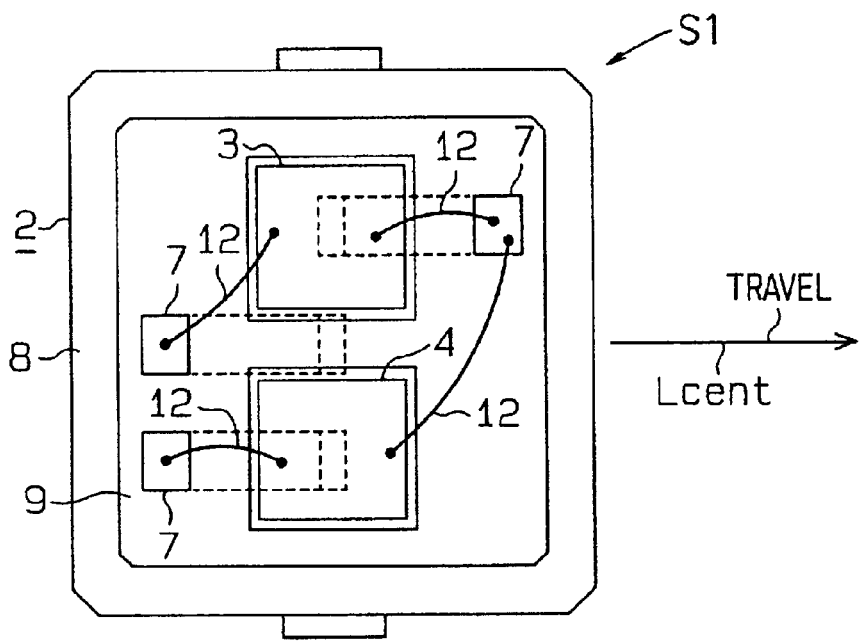
FIG. 2 is another plan view of the solar sensor according to the embodiment.

A solar sensor according to an embodiment is shown in FIGS. 1 and 2 and indicated with reference numeral S1. The solar sensor S1 is applied to an automatic-air-conditioning system in a vehicle. This system is a zone-air-conditioning system that enables independent temperature control for each of passengers in the driver's seat and in the passenger's seat. The zone-air-conditioning system maintains a desired temperature in a vehicle by means of compensating automatically a solar influence and controlling automatically temperature and flow rate of air supplied to a cabin.

Figure 3:
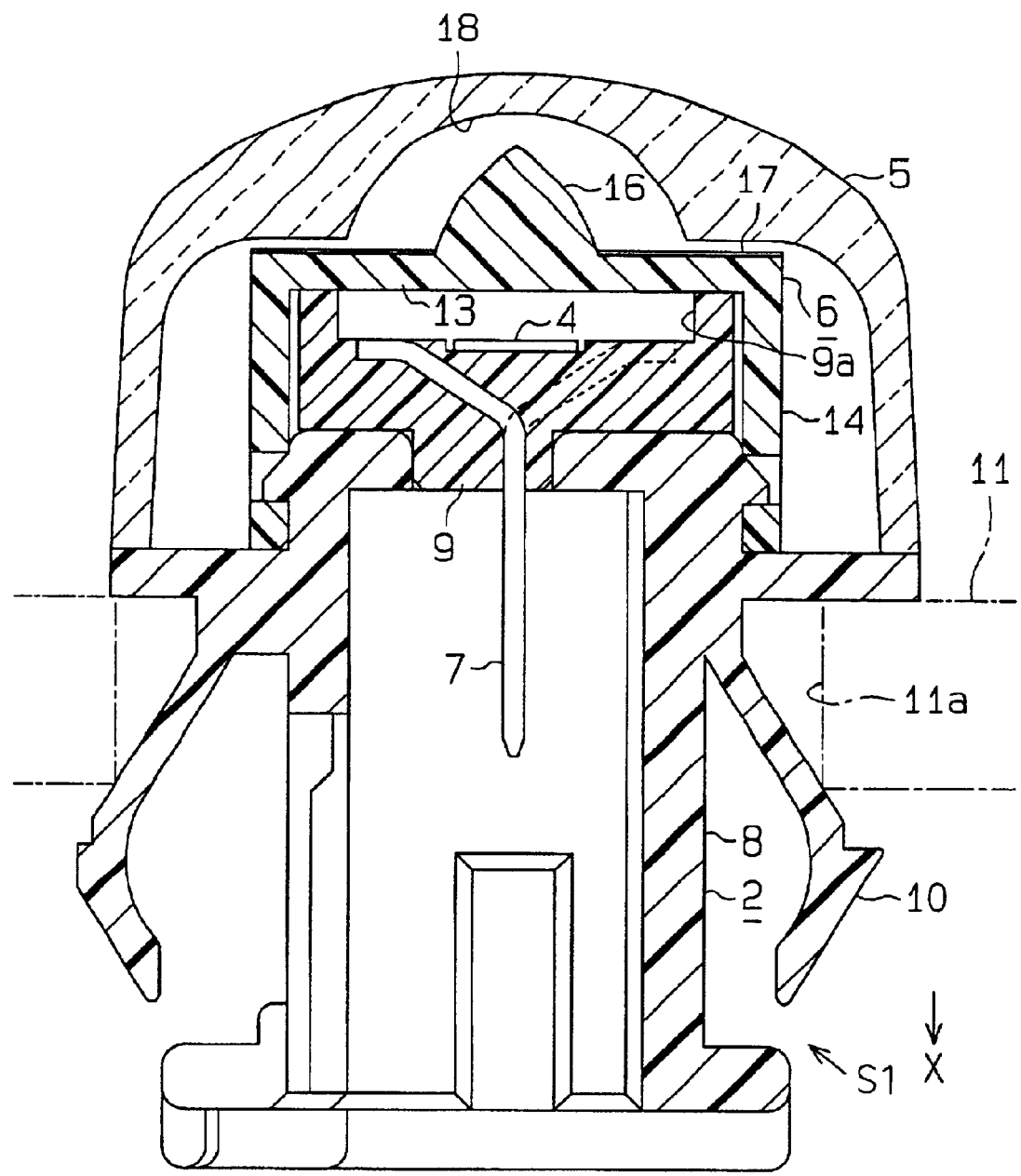
FIG. 3 is a cross-sectional view taken along line III—III in FIG. 1.
Figure 4:
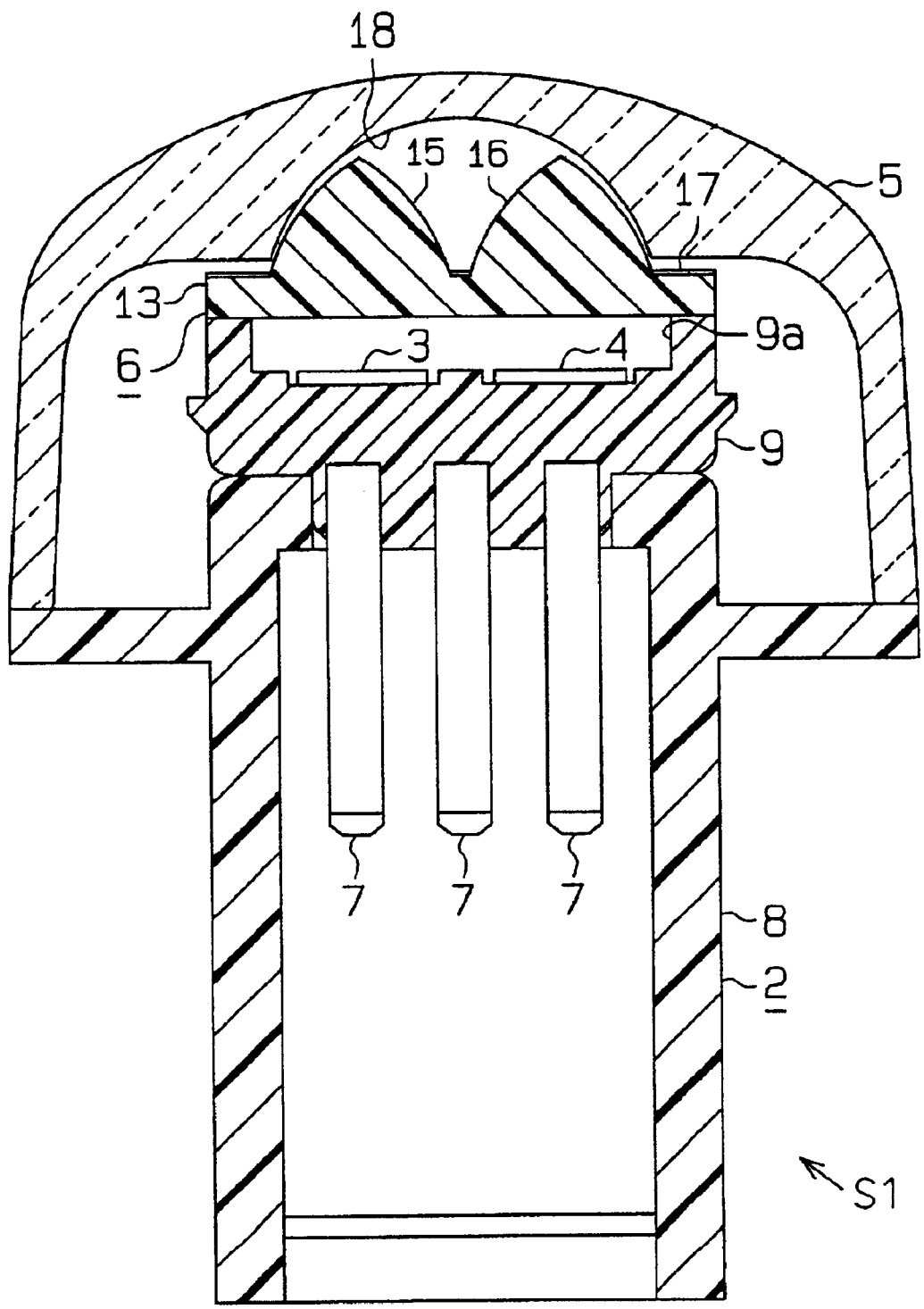
FIG. 4 is a cross-sectional view taken along line IV—IV in FIG. 1.

As shown in FIGS. 3 and 4, the solar sensor S1 includes a housing 2 that works as a connector as well, optical devices (sensor chips) 3 and 4, an optical lens 5 that guides incident light toward the optical devices 3 and 4, a lens member 6 and terminals 7. The housing 2 is composed of a case 8 and a holder 9 that are made of plastic. The case 8 is cylindrical and designed to operate in an orientation as shown in FIGS. 3 and 4. The holder 9 is attached on the top of the case 8. The optical lens 5 shown in FIGS. 3 and 4 is not shown in FIG. 1. Neither the optical lens 5 nor the lens member 6 that is a light diffusion lens in white is shown in FIG. 2.

As shown in FIG. 3, a cantilever hook 10 used for fastening the sensor S1 to a hole 11a in a dash board panel 11 of a vehicle is formed on the outer surface of the case 8. The sensor S1 is snapped into the hole 11a in the direction X and fastened by an outward urge of the hook 10.

The optical devices 3 and 4 are disposed on the bottom of a concave 9a that is made at the central part of the top side of the holder 9. The terminals 7 that output an electric signal are embedded in the holder 9 by means of an insert molding. One end of the terminal 7 is exposed out on the top surface of the holder 9. The other end protrudes from the bottom of the holder 9.

Figure 14:
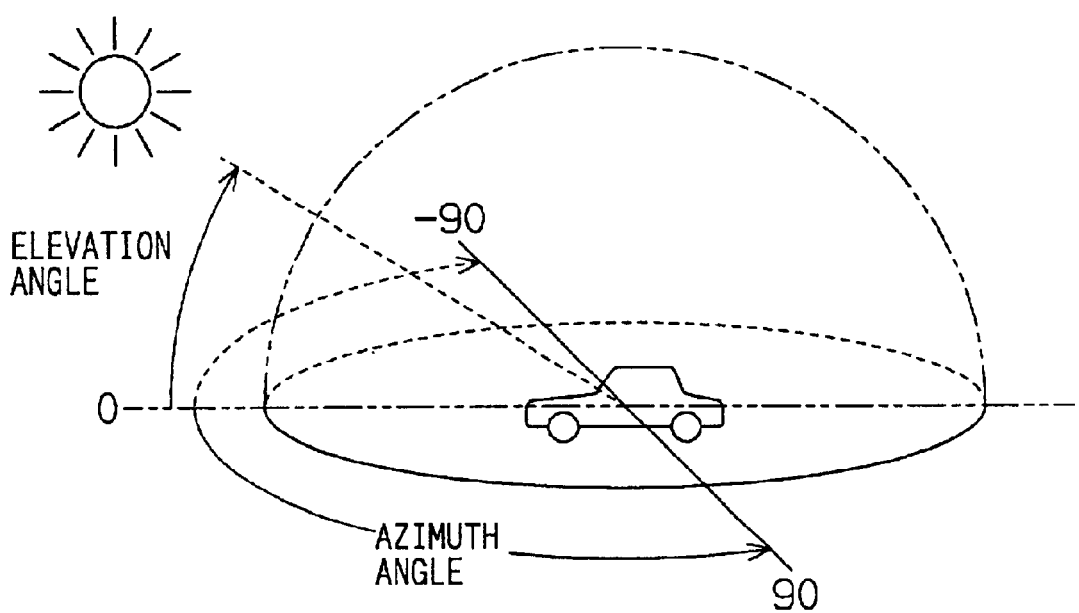
FIG. 14 is a pictorial view showing the terms, solar azimuth angle and solar elevation angle.

As shown in FIG. 2, the optical devices 3 and 4 are disposed in the right side and the left side, respectively, of the axis ($L_{cent}$) that is parallel to the direction of travel of a vehicle. The axis ($L_{cent}$) is the standard axis for solar azimuth angle and solar elevation angle of the sensor S1 mounted on a vehicle. Both angles are defined as shown in FIG. 14. The optical devices 3 and 4 are electrically connected with the terminals 7 via bonding wires 12 and output signals in accordance with the intensity of incident light (quantity of solar radiation). The optical devices 3 and 4 may be a photodiode or phototransistor.

As shown in FIGS. 3 and 4, the lens member 6 is disposed to cover the optical devices 3 and 4 on the top of the holder 9. Namely, the lens member 6 is disposed between the optical devices 3 and 4 and the optical lens 5. The lens member 6 is made of white plastic or white glass and includes a plate-shaped base member 13 that extends horizontally, a fixing part 14 that extends perpendicularly from the periphery on the member 13, and solid projections 15 and 16 on the member 13. The lens member 6 is fixed to the housing 2 in snap-fit between the fixing part 14 of the lens member 6 and the top end of the case 8 at the outside of the holder 9. The projections 15 and 16 are hemispheric and disposed above the optical devices 3 and 4 in such a way that the centers of the projections 15 and 16 are coincident with those of the optical devices 3 and 4, respectively. The top surface of the member 13 is coated with a black screen film 17 (the hatched area in FIG. 1) except the areas under the projections 15 and 16.

The optical lens 5 is bowl-shaped and is made of dyed glass or plastic (translucent material) and fixed to the housing 2 by fitting the both together at the outer edge of the case 8. A hemispheric concave 18 is made at the central area on the inner surface of the optical lens 5 so that the lens 5 functions as an optical lens. The concave 18 is disposed in such a way that the concave 18 covers the projections 15 and 16 with designed clearances in-between.

Figure 5:
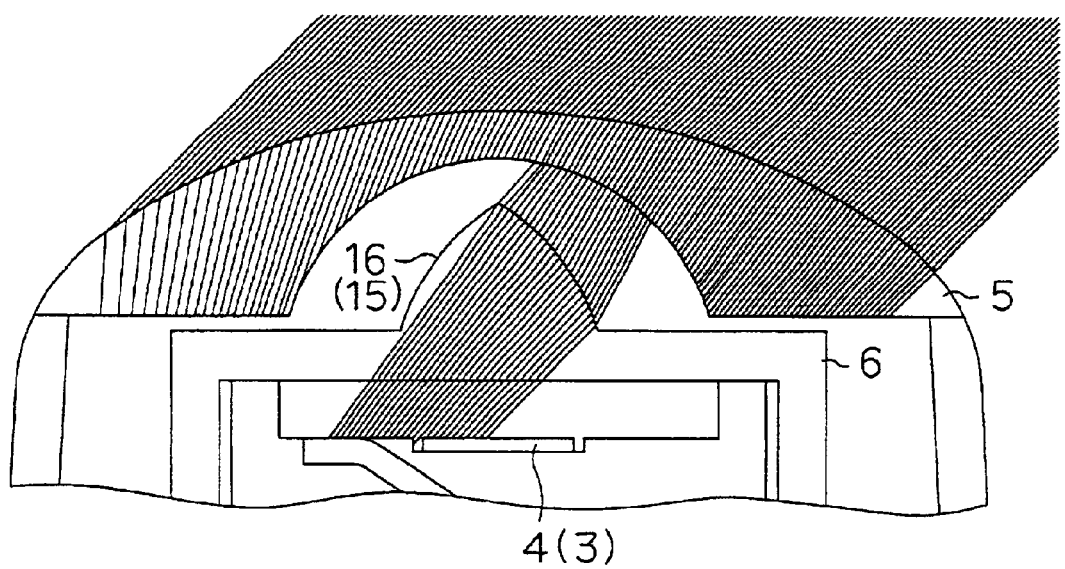
FIG. 5 is a cross-sectional view showing an optical path in the sensor for light from the front side of a vehicle.
Figure 6:
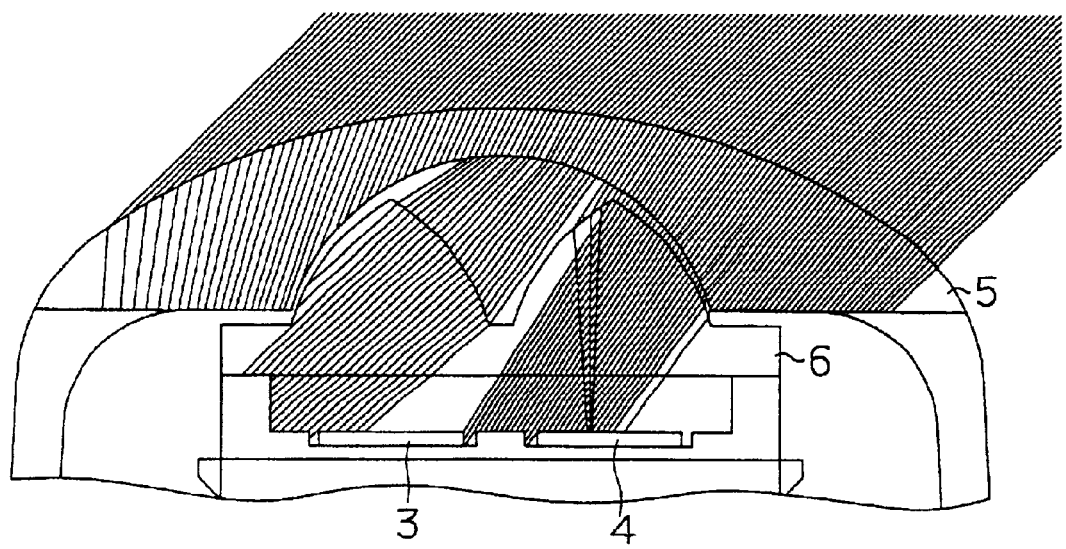
FIG. 6 is a cross-sectional view showing an optical path in the sensor for light from the right side of a vehicle.

The optical path resulting from optical analysis in the case that incident light enters from the front side of a vehicle with 45° of elevation angle is shown in FIG. 5. The optical path resulting from optical analysis in the case that incident light enters from the right side of a vehicle with 45° of elevation angle is shown in FIG. 6. As shown in FIGS. 5 and 6, the concave 18 works as a concave lens and the incident light that enters the optical lens 5 goes out with designed optical characteristics. The characteristics are determined by the refractive index of a lens material and the shape of the lens 5. The lens member 6 functions as a light-guide that guides the light going out from the lens 5 to the optical devices 3 and 4.

In the case that incident light enters from the front side, the projections 15 and 16 receive an equal quantity of light and guide an equal quantity of light to the optical devices 3 and 4, as shown in FIG. 5. However, in the case that incident light enters from the right or left side, the near side projection receives an unreduced quantity of light while the far side projection receives a reduced quantity of light due to light divergence at the lens 5 and interference of the near side projection so that the optical devices 3 and 4 receive a different quantity of light from each other. The case that incident light enters from the right side is shown in FIG. 6. Therefore, measuring the variance in output ratio between the optical devices 3 and 4 enables the detection of solar azimuth angle.

The optical lens 5 functions as a divergent lens so that the incident light spreading out from the lens 5 irradiates the projections 15 and 16. Quantities of light irradiating to the projections 15 and 16 depend on the clearances between the concave 18 and the projections 15 and 16. Therefore, quantities of light irradiating to the optical devices 3 and 4 compensate each other and total quantity of light irradiating to the optical devices 3 and 4 becomes constant by means of designing the clearances. Thereby, total output of left and right optical devices 3 and 4 becomes constant in the detection of solar irradiation (quantity of light) irrespective of solar direction (azimuth angle). Namely, it is possible to make the sensitivity of the sensor S1 for solar radiation constant irrespective of solar azimuth angle and depend only on solar elevation angle.

Figure 7:
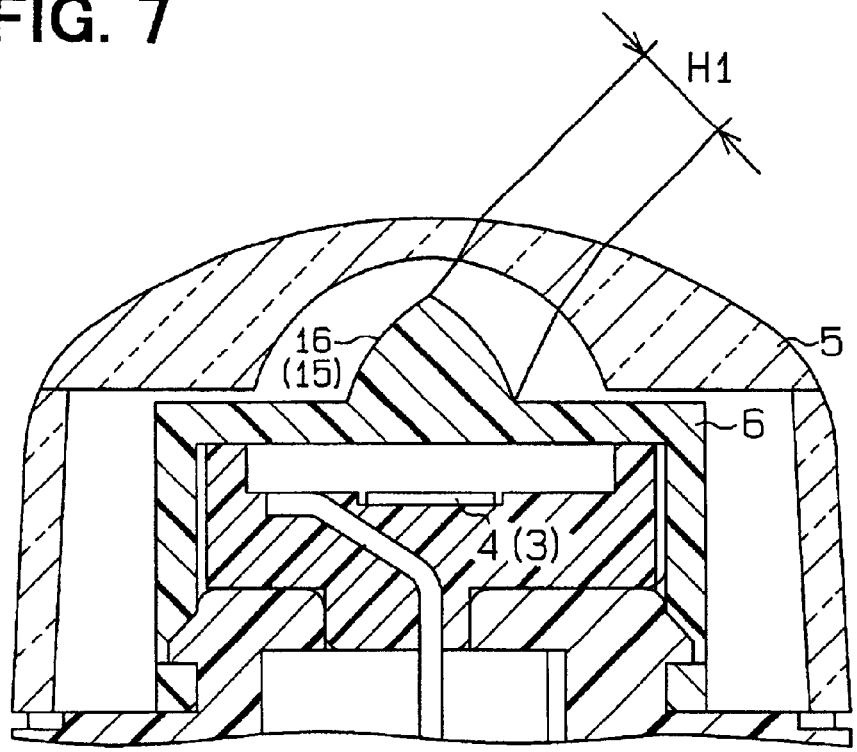
FIG. 7 is another cross-sectional view showing an optical path in the sensor for light from the front side of a vehicle.
Figure 8:
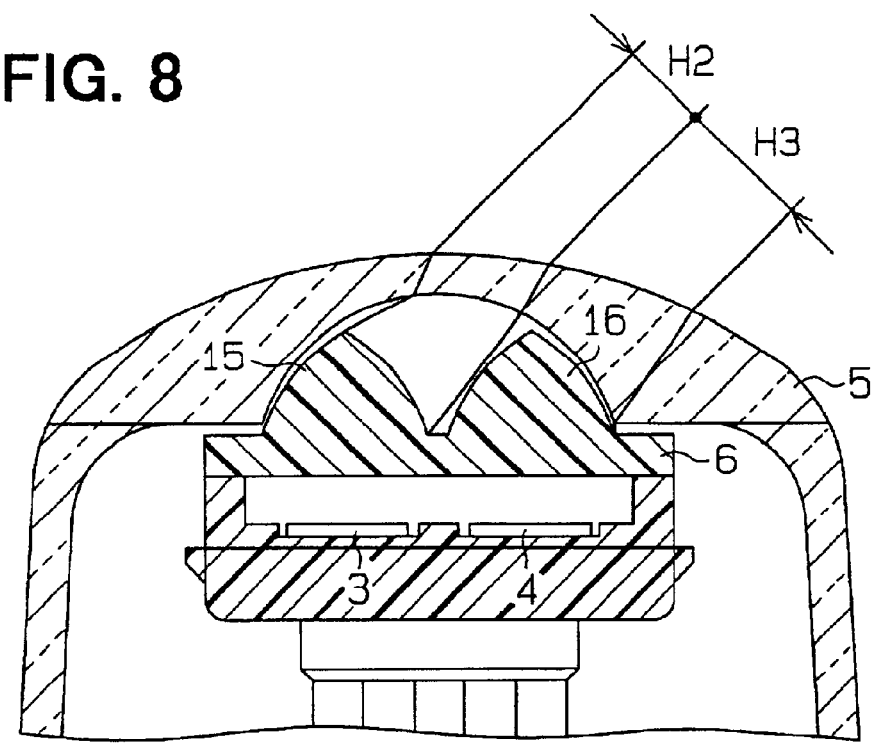
FIG. 8 is another cross-sectional view showing an optical path in the sensor for light from the right side of a vehicle.

The function of the optical lens 5 and the projections 15 and 16 is described in detail as follows. As shown in FIG. 7, in the case that incident light enters from the front side, the optical devices 3 and 4 receive an equal quantity of light H1 through the projections 15 and 16 so that the total output of the optical devices 3 and 4 is equivalent to H1×2. As shown in FIG. 8, in the case that incident light enters from right or left side, the optical devices 3 and 4 receive a quantity of light, H2 and H3 through the projections 15 and 16, respectively, so that the total output of the optical devices 3 and 4 is equivalent to H2+H3.

The optical analysis for the case shown in FIGS. 5 and 6 results in H1=2.8, H2=2.2 and H3=3.4. Namely, the total output in the case that incident light enters from the front side (H1×2) is equivalent to 5.6 (2.8×2) and the total output in the case that incident light enters from right or left side (H2+H3) is equivalent to 5.6 (2.2+3.4). The results confirm that the total output of the sensor S1 is constant irrespective of solar azimuth angle.

Figure 9A:
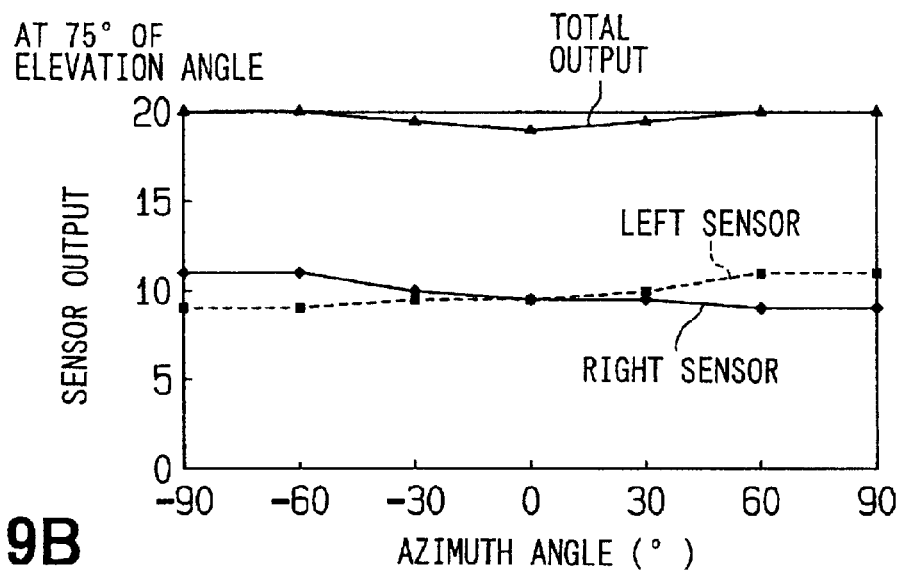
FIGS. 9a, 9b and 9c are graphs showing correlation between output of optical device and solar azimuth angle at 75°, 45° and 15° of elevation angles, respectively, in the embodiment.
Figure 9B:
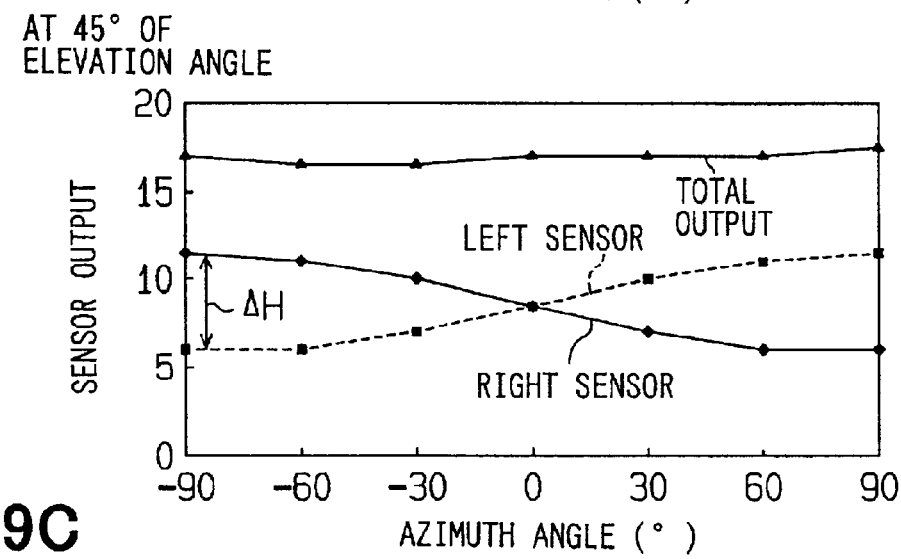
Figure 9C:
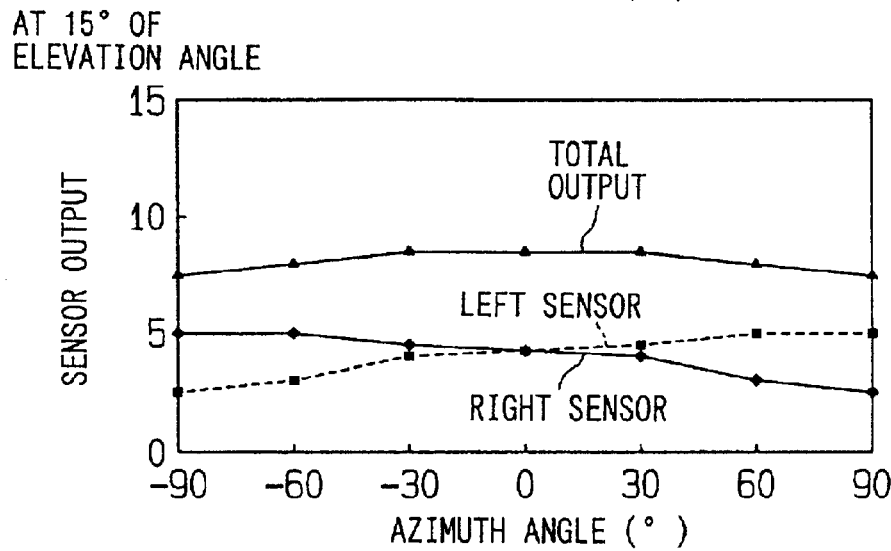
Figure 12:
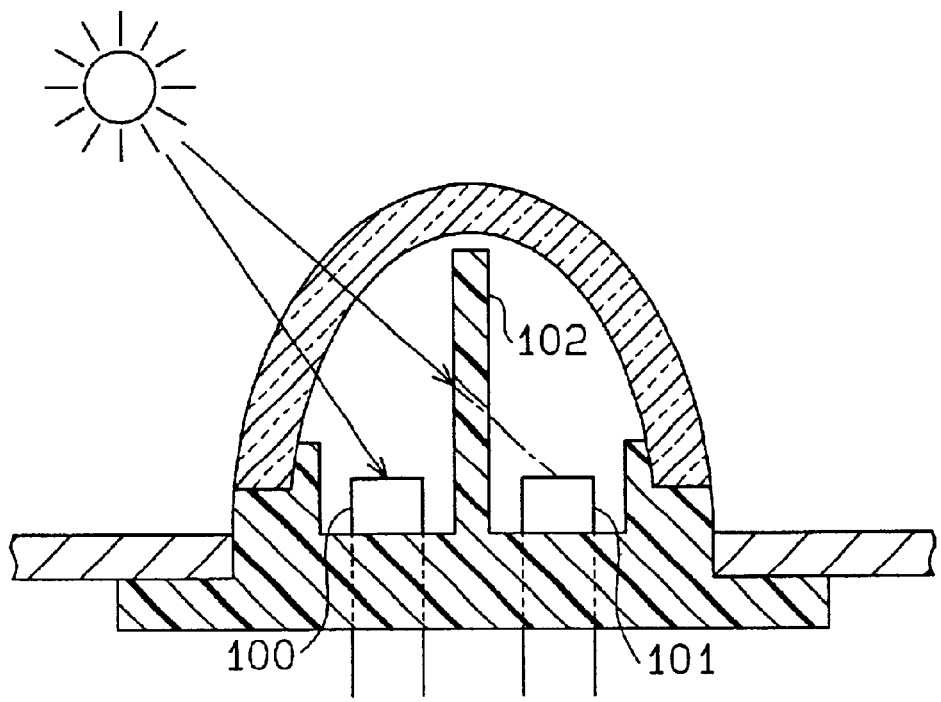
FIG. 12 is a cross-sectional view of a proposed solar sensor.
Figure 13A:
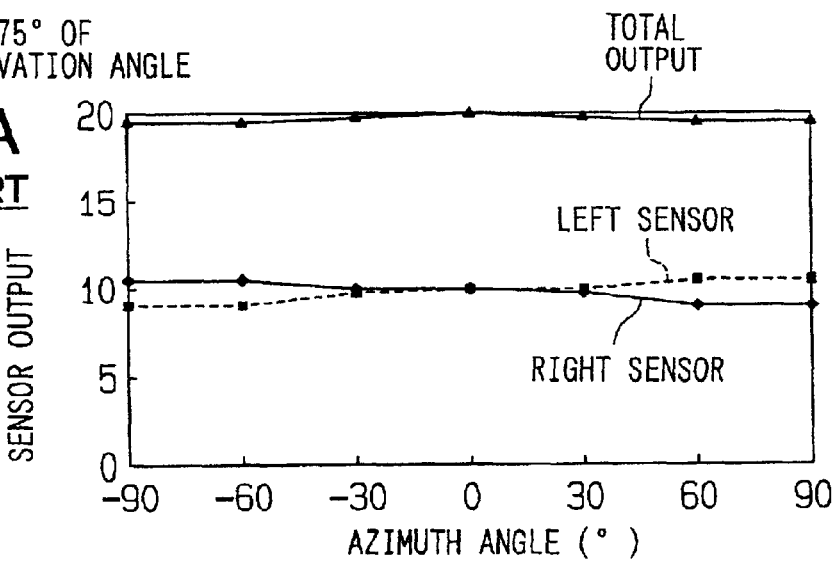
FIGS. 13a, 13b and 13c are graphs showing correlation between output of optical device and solar azimuth angle at 75°, 45° and 15° of elevation angles, respectively, in the proposed solar sensor.
Figure 13B:
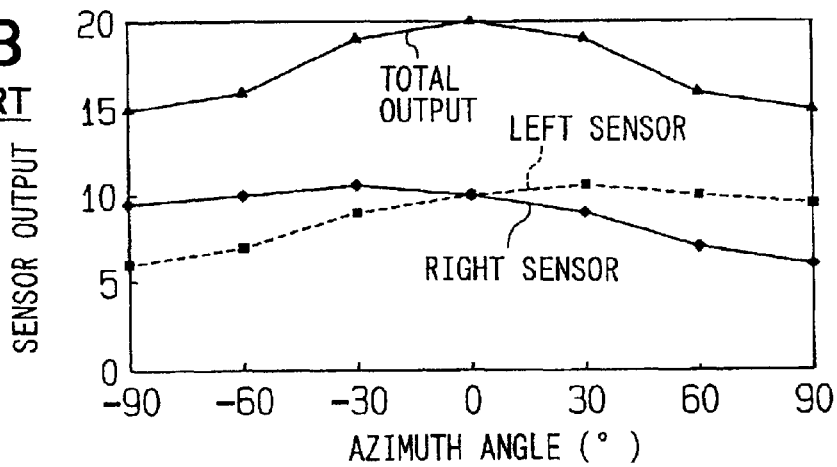
Figure 13C:
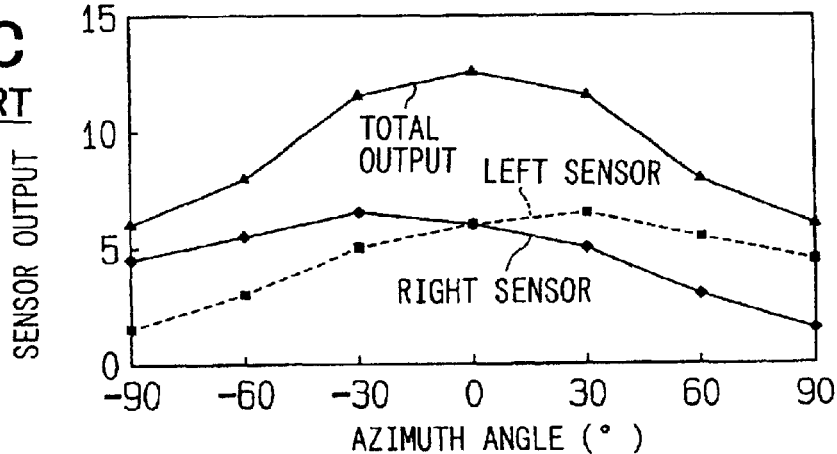

As shown in FIG. 13c, the total output of the proposed solar sensor shown in FIG. 12 at 15° of solar elevation angle varies significantly in accordance with solar azimuth angle. For example, the total outputs at +90° and −90° of solar azimuth angles decrease by ca. 50% in comparison with that at 0° of solar azimuth angle. However, in the present embodiment, the influence of the solar azimuth angle is reduced, as shown in FIGS. 9a, 9b and 9c. The difference in total output of the solar sensor in the present embodiment at 15° of solar elevation angle decreases to ca. 5%.

As shown in FIG. 12, the screen wall 102 in the proposed sensor enhances the balance of the outputs between the optical devices 3 and 4 by means of attenuating or screening incident light irradiating to the far side optical device 101 so that total quantity of solar irradiation varies significantly in accordance with solar azimuth angle. In contrast, in the present embodiment, forming lens member 6 (light-guide) above the devices 3 and 4 provides the same effect as disposing three-dimensionally the optical devices 3 and 4 (enhancing the output balance between the devices 3 and 4) and enables the total quantity of solar irradiation to the devices 3 and 4 to be constant in collaboration with the optical lens 5.

The top surface of the member 13 is coated with the screen film 17 except the areas under the projections 15 and 16 so that the contrast between a bright area and a dark area is enhanced on the optical devices 3 and 4. As a result, it is possible to enhance further the balance ($\Delta$H in FIG. 9) of the outputs between the optical devices 3 and 4.

(Modification of Embodiment)

Figure 10:
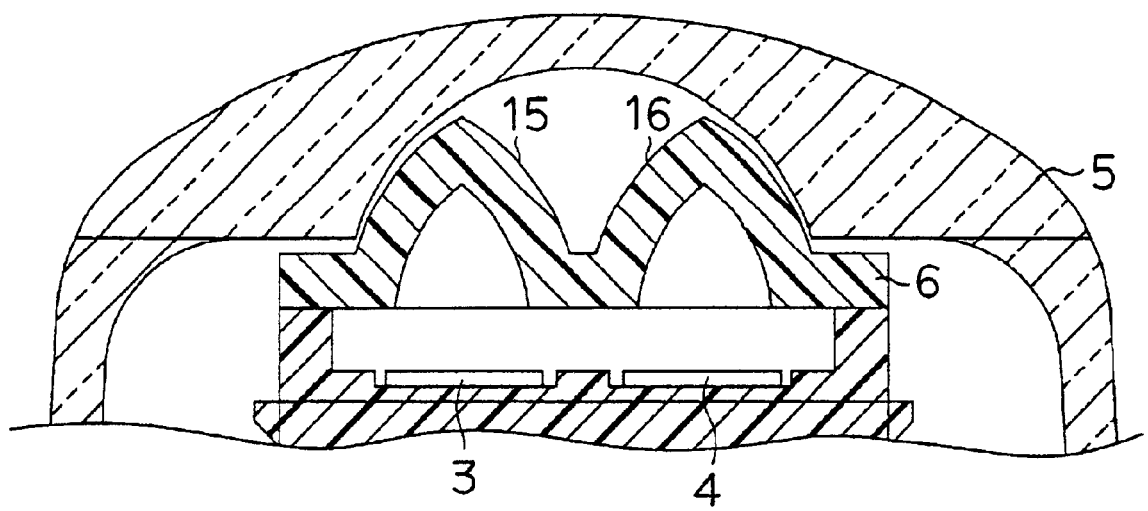
FIG. 10 is a cross-sectional view of a solar sensor according to a modification of the embodiment.

Major differences in this modification from the above embodiment are in the structure of the projections 15 and 16 and in the screen 17 on the lens member 6. In this modification, the lens member 6 is not coated with the screen 17 and the projections 15 and 16 are hollow and in a bowl shape as shown in FIG. 10. The solid projections 15 and 16 in the embodiment intensify irradiation of solar light to the optical devices 3 and 4. However, the structure of the solid projections 15 and 16 enhance alignment deviation of the lens member 6 in fabrication. Therefore, in this modification, the lens member 6 is made of plastic that includes a light diffusing material so that it is possible to alleviate the alignment deviation by scattering incident light. Increasing light transmittance of the projections 15 and 16 by means of employing the hollowed structure enables to omit the screen 17 on the lens member 6 and reduce costs. The lens member 6 maybe made of a transparent material. In that case, the purpose of this embodiment is realized by an optical redesigning of the lens member 6.

Figure 11:
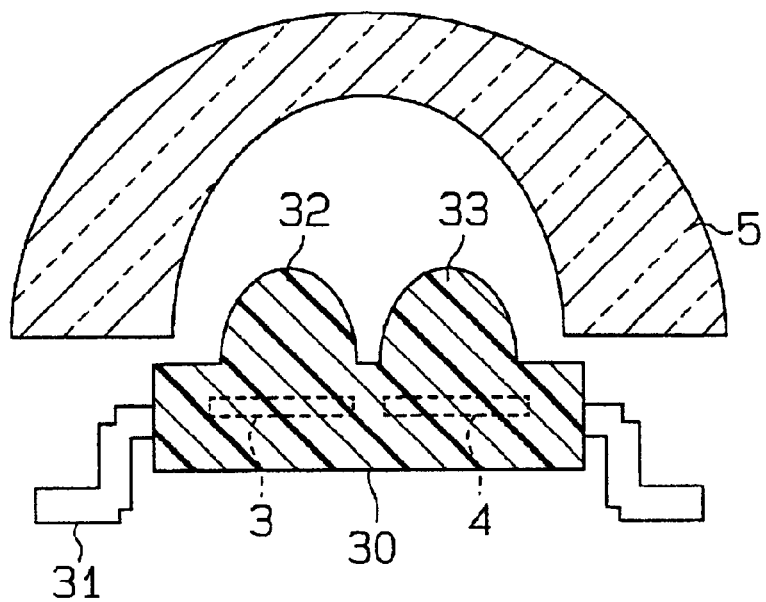
FIG. 11 is a cross-sectional view of a solar sensor showing another modification of the embodiment.

As shown in FIG. 11, a monolithic IC structure is employed in another modification. The optical devices 3 and 4 are die-mounted on a lead frame 31 and molded by a mold member 30. Projections 32 and 33 are formed as parts of the mold member 30. Namely, the mold member 30 doubles the lens member 6. Transparent epoxy resin may be used as a material for the mold member 30.

The above embodiment may be modified further within the spirit of the present invention.

What is claimed is:

1. A solar sensor comprising:

a housing;

a pair of optical devices respectively disposed on a right side and a left side of an axis parallel to a direction of travel of a vehicle on a top side of the housing;

a concave optical lens that is disposed above the optical devices and guides incident light toward the optical devices; and a lens member that is disposed between the optical devices and the concave optical lens, wherein the lens member comprises a pair of projections each defining a peak, the pair of projections for respectively guiding the incident light to the pair of optical devices, and wherein the peaks of the pair of projections are respectively disposed above the pair of optical devices and substantially in a space defined by a concavity of the concave optical lens.

2. The solar sensor as in claim 1, wherein a first clearance between the concave optical lens and each of the pair of projections in the direction of travel of a vehicle is greater than a second clearance between the concave optical lens and the pair of projections in a direction perpendicular to the direction of travel on a horizontal plane.

3. The solar sensor as in claim 1, wherein each of the pair of projections has a solid structure.

4. The solar sensor as in claim 1, wherein each of the pair of projections has a hollow structure.

5. The solar sensor as in claim 1, wherein a surface of the lens member facing the optical lens is coated with a screen film except on an area under the pair of optical projections.

6. The solar sensor as in claim 1, wherein the housing includes a cantilever hook for fastening the housing to a vehicle panel.

7. The solar sensor as in claim 1, wherein the pair of projections is further for enabling a total output of the pair of optical devices to be substantially constant irrespective of a solar azimuth angle.

8. The solar sensor as in claim 1, wherein the pair of projections is further for enabling a first total output of the pair of optical devices when light is received from the front side to be substantially equal to a second total output of the pair of optical devices when light is received from the right or left side.

9. The solar sensor as in claim 1, wherein the optical devices are disposed substantially on a common plane.

10. The solar sensor as in claim 1, wherein the peaks of the pair of projections are coincident with respective centers of the optical devices.

11. The solar sensor as in claim 1, wherein the peaks of the pair of projections are coincident with respective centers of the pair of projections.

12. The solar sensor as in claim 1, wherein the peaks of the pair of projections are coincident with respective centers of the optical devices and with respective centers of the pair of projections.

13. The solar sensor as in claim 1, wherein each of the pair of projections is hemispheric in shape.

14. The solar sensor as in claim 13, wherein the peaks of the pair of projections are coincident with respective centers of the optical devices.

15. The solar sensor as in claim 13, wherein the peaks of the pair of projections are coincident with respective centers of the pair of projections.

16. The solar sensor as in claim 13, wherein the peaks of the pair of projections are coincident with respective centers of the optical devices and with respective centers of the pair of projections.

* * * * *